United States Patent [19]
Lehman et al.

[11] Patent Number: 5,267,444
[45] Date of Patent: Dec. 7, 1993

[54] PROCESS FOR THE CRYOGENIC SEPARATION OF OXYGEN CONTAINING MIXTURES, ORGANIZED LINING THEREFORE AND AIR DISTILLATION COLUMN INCLUDING SUCH LINING

[75] Inventors: Jean-Yves Lehman, Maisons Alfort; Jean-Claude Colin, Yerres, both of France

[73] Assignee: L'Air Liquide, Societe Anonyme Pour l'Etude et l'Exploitation des Procedes Georges Claude, Paris, France

[21] Appl. No.: 864,687

[22] Filed: Apr. 7, 1992

[30] Foreign Application Priority Data

Apr. 19, 1991 [FR] France .................. 91 04844

[51] Int. Cl.⁵ .................. F25J 3/02; B01F 3/04
[52] U.S. Cl. .................. 62/36; 261/112.2
[58] Field of Search .......... 165/166; 62/36; 261/112.2; 202/158

[56] References Cited

U.S. PATENT DOCUMENTS

| | | | |
|---|---|---|---|
| 3,599,943 | 8/1971 | Munters | 261/112.2 |
| 3,612,494 | 10/1971 | Toyama et al. | 261/112.2 |
| 4,385,012 | 5/1983 | Priestley | 261/112.2 |
| 4,581,157 | 4/1986 | Twigg | 502/326 |
| 4,670,196 | 6/1987 | Hsia | 261/112.2 |
| 4,732,713 | 3/1988 | Korsell | 261/112.2 |
| 4,740,334 | 4/1988 | Rukovena, Jr. | 261/112.2 |
| 4,929,399 | 5/1990 | Lockett et al. | 261/112.2 |
| 4,981,621 | 1/1991 | Pluss | 261/112.2 |
| 5,100,448 | 3/1992 | Lockett et al. | 62/36 |
| 5,132,056 | 7/1992 | Lockett et al. | 261/112.2 |

FOREIGN PATENT DOCUMENTS

0337150 10/1989 European Pat. Off. .
0341854 11/1989 European Pat. Off. .
0447943A1 9/1991 European Pat. Off. .

*Primary Examiner*—John Rivell
*Assistant Examiner*—L. R. Leo
*Attorney, Agent, or Firm*—Curtis, Morris & Safford

[57] ABSTRACT

A process for the cryogenic separation of mixtures containing oxygen to obtain a produce having a high concentration of oxygen. In this process, a heat and material exchange occurs in counter-current between a descending liquid and a rising gas in at least one transfer zone including a bundle of organized linings consisting of cross-undulated metallic layers. In at least one transfer zone where the concentration of oxygen is higher than 98%, the layers are made of a sheet of aluminum having a thickness between 0.3 and 1 mm. Additionally, the bundles of layers have a specific surface lower than 400 $m^2/m^3$.

16 Claims, 1 Drawing Sheet

PROCESS FOR THE CRYOGENIC SEPARATION OF OXYGEN CONTAINING MIXTURES, ORGANIZED LINING THEREFORE AND AIR DISTILLATION COLUMN INCLUDING SUCH LINING

BACKGROUND OF INVENTION (a) Field of the Invention

The present invention concerns processes for the cryogenic separation of mixtures containing oxygen to give a product with a high concentration of oxygen, comprising the step of carrying out an exchange of heat and material in counter-current between a descending liquid and a rising gas in at least one transfer zone including a bundle of organized linings consisting of cross-undulated metallic layers.

(b) Description of Prior Art

A process and organized linings of this type have been described in the document WO-A-89/10527, in the name of the Applicant, of which the content is understood to be incorporated herein by reference.

In the known processes of this type, such as for the distillation of air, the metallic layers of lining are made from sheets having a thickness of 0.2 mm and have a specific surface of about 500 $m^2/m^3$, the metal being stainless steel, aluminum or copper (see introduction of the presentation at the 1990 AIChE Loss Prevention Symposium of August 1990 in San Diego by Messrs. Dunbobbin, Werley and Hansel).

In practice, because of its cost and its performances, aluminum is the best material for most applications involving cryogenic separations. However, in the zones of high oxygen purity (higher than 98%), for example under elevated pressure, aluminum may present risks of ignition in linings of this type. This is the reason why it has been proposed (see the above mentioned presentation) to rely only on copper linings, in spite of the substantial cost increase thereof.

SUMMARY OF INVENTION

It is an object of the present invention to propose a process of cryogenic separation enabling to use linings of aluminum even in zones of very high concentration of oxygen and under elevated pressure, while eliminating the risks of ignition and enabling to maintain reduced manufacturing costs.

For this purpose, according to a characteristic of the invention, at least in a transfer zone where the concentration of oxygen is higher than 98%, the layers are made of aluminum sheet having a thickness between 0.3 and 1 mm, the bundle of layers having a specific surface lower than 400 $m^2/m^3$, typically between 100 $m^2/m^3$ and 300 $m^2/m^3$.

According to a more specific characteristic of the invention, the layers are prepared with a wave pitch higher than 7 mm, typically on the order of 10 mm and contrary to the layers of the usual lining, they have a rate of perforation lower than 10 perforations per $m^2$, in practice substantially free of perforations.

According to another characteristic of the invention, the bundle of layers is subject to a step of superficial oxidation either of the anodic type, or with formation of oxide by dipping in water or under an oxidizing atmosphere containing water vapor, typically at a temperature between 60° and 200° C. during at least one hour.

It is also an object of the present invention to provide an organized lining for carrying out this process, characterized in that it consists of layers of aluminum sheets having a controlled thickness between 0.3 and 1 mm and presenting a wave pitch higher than 7 mm, typically about 10 mm, and substantially free of perforations.

The metallic layers of known organized linings are prepared with surface roughness, such as embossing or more generally ridges, to promote liquid spreading, with the consequence of increasing the importance of the film of liquid oxygen present at the surface of the lining, and therefore to be closer to stoichiometric proportions.

It is another object of the present invention to propose improvements to organized linings intended to reduce the ratio between quantities of liquid oxygen and the stoichiometric amount in order to more radically remove the risks of ignition.

To do this, according to a characteristic of the invention, the sheet has smooth surfaces, typically a thickness variation which does not exceed one hundredth of millimeter more or less, advantageously of the order of 5 thousandth of millimeter.

The measures according to the invention enable, by the choice of the thickness of the sheet and its surface treatment, to increase thermic inertia and to thus limit the possibility of propagation of a possible fire. The decrease of the specific surface enables to decrease the adiabatic character of the lining structure by diluting the heat evolved by the ignition of an organic impurity and that resulting from a local combustion of the material. The substantial reduction of the number of perforations, and even their disappearance, enables to increase confinement in the lining structure so as to preserve the gases from a possible combustion at the location of the latter. Finally, the superficial oxidation of the sheets substantially limits the risks of ignition.

These measures enable to extend the field of aluminum linings to high purities of oxygen and elevated pressures with an excellent safety and at a cost which remains limited.

BRIEF DESCRIPTION OF DRAWINGS

Other characteristics and advantages of the present invention will appear from the description which follows of an embodiment, given by way of illustration but without limitation with reference to the annexed drawings, in which.

DESCRIPTION OF PREFERRED EMBODIMENTS

Figure 1:
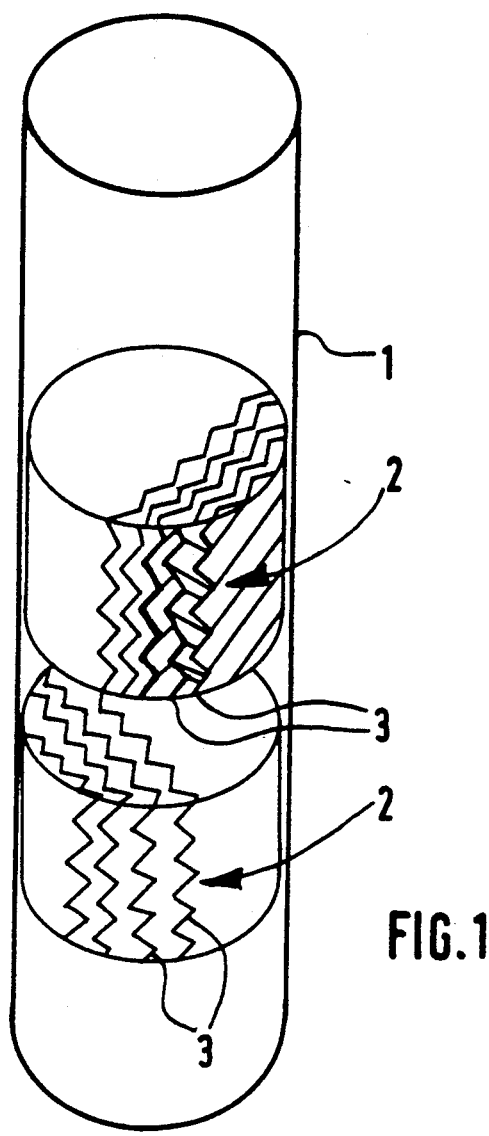
FIG. 1 is a schematic illustration of an air distillation column provided with cross-undulated linings according to the invention.
Figure 2:
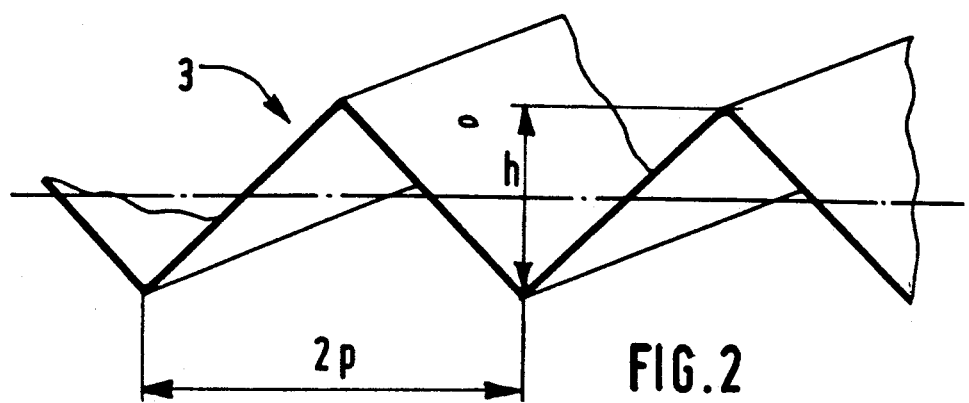
FIG. 2 is a schematic illustration in cross-section of a layer of lining according to the invention.

As illustrated in FIG. 1, a column for air distillation 1 includes at least one bundle of linings 2 each consisting of a crossed assembly of layers 3 which are obliquely undulated, the waves having typically a triangular profile, as seen in FIG. 2. The direction of inclination of the waves is reversed from one layer to the next one. All the layers of a same element are disposed in parallel vertical planes. The linings 2 constitute devices for counter-current heat and material exchange between a descending liquid and a rising gas in the column, at the bottom of which an oxygen rich liquid is typically collected, a mixture of gas which is poor in oxygen being recovered at the top of the column.

According to the invention, the layers 3 are prepared by cutting and shaping sheets of aluminum having a thickness which is controlled between 0.3 and 1 mm, typically about 0.5 mm, the variations of thickness not exceeding 1 hundredth of millimeter more or less. The waves have a pitch p higher than 7 mm, typically of the order of 10 mm and a wave height h higher than 7 mm, typically of the order of 10 mm. Each layer is substantially free of perforations, the number of perforations not exceeding 10 perforations per square meter of layer. The linings prepared by mounting such layers have a specific surface lower than 400 m$^2$/m$^3$, typically between 100 m$^2$/m$^3$ and 300 m$^2$/m$^3$ depending on the conditions of purity and pressure.

According to an aspect of the invention, each preformed layer is subject, before assembling, to a step of degreasing and cleaning by immersion or vaporization with a cleaning composition or a solvent followed by drying (in dry air, possibly heated at a temperature lower than 100° C.), in order to remove the organic deposits that may be present.

According to another aspect of the invention, the smooth sheet is left as is following lamination, by possibly undergoing an ulterior operation of cold polishing.

The thickness of the streaming film, during operation on an inclined plate is established by the following equation:

$$y = [3 \, \mu q / \rho \cdot g \cdot L \cdot \cos \theta]^{\frac{1}{3}}$$

where $\mu$ is the dynamic viscosity, q is the flow rate of the liquid in volume, $\rho$ is the voluminal mass of liquid, g represents the weight acceleration, L is the width of the plate (double face) and $\theta$ is the angle that the plate forms with the vertical.

For a known lining having a specific surface of 500 m$^2$/m$^3$, with $\mu = 15 \times 10^{-5}$ daP, q = 4 $\times 10^{-3}$ m$^3$/s and L = 500 meters (for a column having a cross-section of 1 m$^2$), $\rho = 1135$ kg/m$^3$ and $\theta = 60°$, the thickness y of the film is equal to 80 microns. For one cubic meter of lining, there is thus obtained $80 \times 10^{-6} \times 500 = 0.04$ m$^3$ of liquid oxygen, or 45.40 kg or 2837 atoms-grams of oxygen, which may be compared to $0.2 \times 10^{-3} \times 250 = 0.05$ m$^3$ of aluminum, or 135 kg or 5000 atoms-grams of aluminum. The stoichiometric proportion of oxygen would be $5000 \times 3 \frac{1}{2} = 7500$ atoms-grams. There is thus obtained a stoichiometric ratio of $2837/7500 = 0.38$. Since the surface is not smooth, but is covered with ridges, the operation is not successful and the thickness of the film of oxygen which results therefrom is higher, so that in fact, the quantity of liquid oxygen stored of the surface corresponds to a stoichiometric ratio which is doubled, or 0.76.

According to the invention, with a lining of specific surface equal to 300 m$^2$/m$^3$, a thickness of aluminum sheet of 0.5 mm and a smooth sheet, the ratio of the stoichiometric quantity become 0.18. With a lining having a specific surface equal to 200 m$^2$/m$^3$, a sheet of aluminum having a thickness of 0.6 mm and a smooth sheet, the ratio of stoichiometric quantity becomes 0.10. It will be understood that with an arrangement according to the invention, the risks of ignition are virtually eliminated.

The process and the lining according to the invention are particularly suitable for the zones of columns for distillation of air with oxygen contents higher than 98%, which may reach 99.99% and/or under local pressures higher than $1.5 \times 10^5$ Pa absolute.

We claim:

1. Process for the cryogenic separation of mixtures containing oxygen to give a product having a high concentration of oxygen, comprising the step of effecting a heat and material exchange in counter-current between a descending liquid and a rising gas in at least one transfer zone including a bundle of organized linings consisting of cross-undulated metallic layers, wherein at least in one transfer zone where the concentration of oxygen is higher than 98%, the layers are made of a sheet of aluminum having a thickness between 0.3 and 1 mm, the bundle of layers having a specific surface lower than 400 m$^2$/m$^3$.

2. Process according to claim 1, wherein the specific surface is between 100 and 300 m$^2$/m$^3$.

3. Process according to claim 2, wherein each layer is prepared with a wave pitch higher than 7 mm.

4. Process according to claim 3, wherein each layer is prepared with a wave height higher than 7 mm.

5. Process according to claim 1, wherein each layer has a density of perforations lower than 10 perforations per m$^2$.

6. Process according to claim 1, wherein the bundle is subject to a step of superficial oxidation.

7. Process according to claim 1, wherein each layer undergoes a step of cleaning before being assembled.

8. Process according to claim 1, wherein the pressure in said transfer zone is higher than $1.5 \times 10^5$ Pa absolute.

9. Organizing lining for the cryogenic separation of mixtures containing oxygen comprising cross-undulating, metallic layers, which permit heat and material exchange between a descending liquid and a rising gas wherein, for an oxygen concentration of more than 98% in a region surrounding said lining, said lining comprises an arrangement of layers of aluminum sheet having a thickness between 0.3 and 1 mm and has a predetermined wave pitch and height such that the lining has a specific surface less than 400 m$^2$/m$^3$.

10. Lining according to claim 9, wherein the layers are substantially free of perforations.

11. Lining according to claim 9, wherein the sheet has smooth surfaces.

12. Lining according to claim 11, wherein the sheet has a variable thickness not exceeding about 1/100th of mm.

13. Lining according to claim 12, wherein the sheet has an average variable thickness of about $5 \times 1/1000$th of mm.

14. Lining according to claim 13, wherein the sheet is subject to a polishing operation after lamination.

15. Air distillation column, which comprises at least one bundle of linings according to claim 9 having a specific surface lower than 400 m$^2$/m$^3$.

16. The organizing lining for the cryogenic separation of mixtures containing oxygen of claim 9 wherein the layers have a wave pitch higher than 7 mm.

* * * * *